July 14, 1931.  E. L. FICKETT  1,814,911
GEARING
Filed June 11, 1928  2 Sheets-Sheet 2
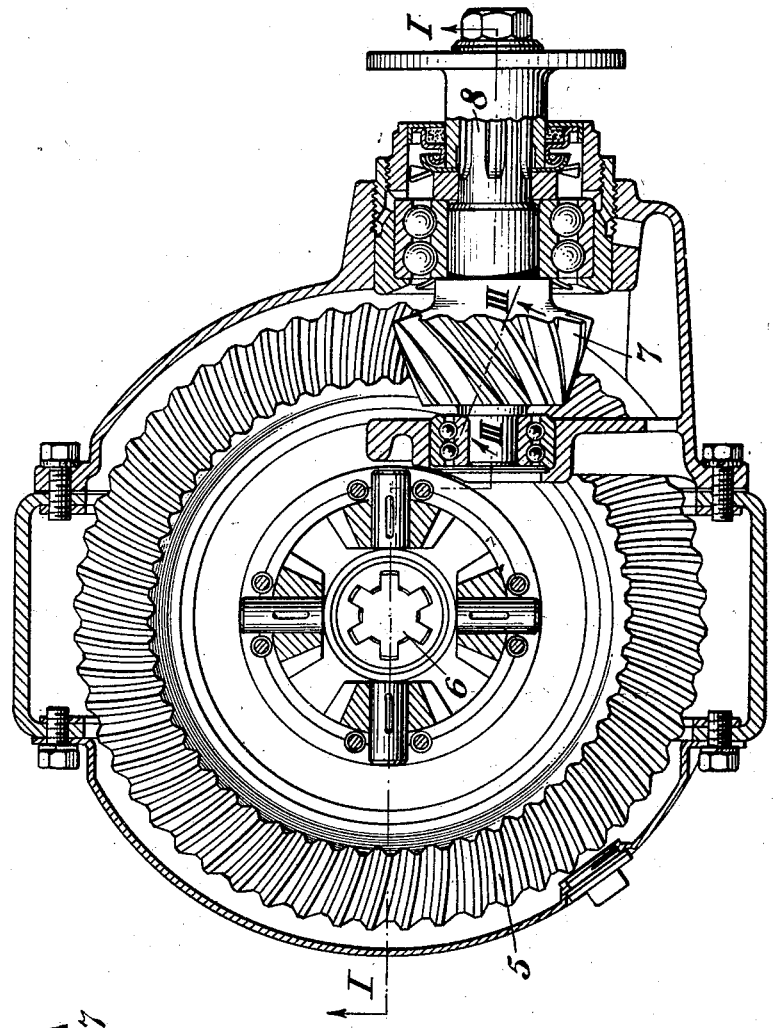
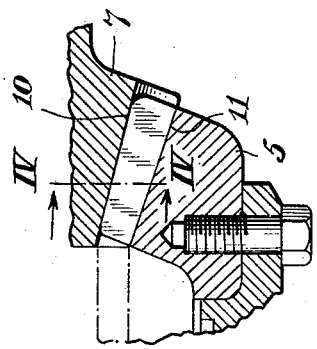
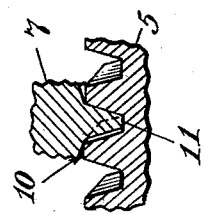
Inventor
Ernest L. Fickett
By his Attorney
Maurice B. Landes Patented July 14, 1931

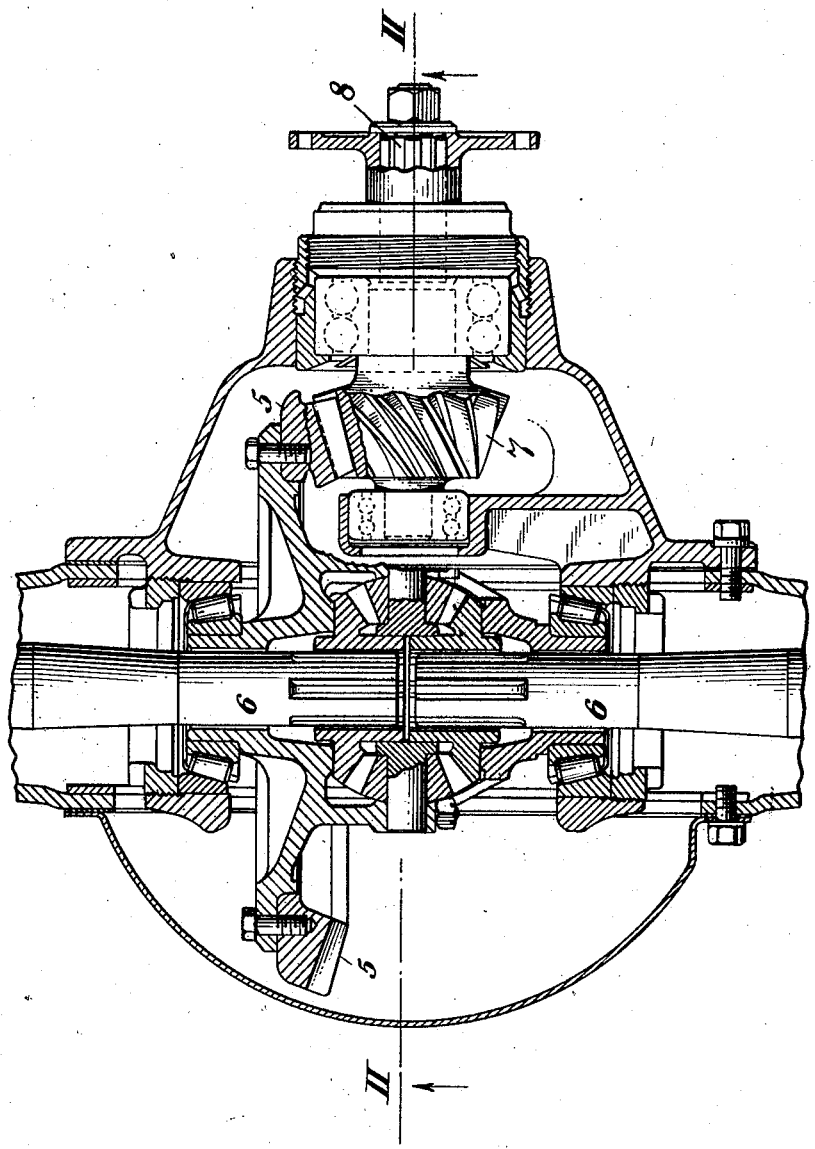

1,814,911

UNITED STATES PATENT OFFICE

ERNEST L. FICKETT, OF FITCHBURG, MASSACHUSETTS, ASSIGNOR, BY MESNE ASSIGN-
MENTS, TO SCURLOCK GEAR CORPORATION, OF NEW YORK, N. Y., A CORPORATION
OF NEW YORK

GEARING

Application filed June 11, 1928. Serial No. 284,487.

The present invention has for an object to provide an improved gearing.

The invention has been developed in connection with the production of a transmission gearing of a motor vehicle and as a convenient illustration of the principles involved, such an embodiment will be more particularly described but it will be understood that the description is illustrative merely and is not intended as defining the limits of the invention.

In gearing of certain types such for example as that in which the ring gear of an automobile differential mechanism is driven by spiral gears from a drive shaft, the axis of which does not intersect the axis of the ring gear, the action when driving in one direction tends to cause a binding of the gears. The present invention provides an arrangement in which the disadvantageous effects of this binding action are avoided. In the embodiment disclosed for the purposes of illustration the gears are so designed that the tops of the teeth bottom in the spaces between the teeth of the mating gear with a sliding contact and thereby function to prevent the binding that would otherwise occur.

The nature and objects of the invention will be better understood from a description of a particular embodiment for the purposes of which description reference should be had to the accompanying drawings forming a part hereof and in which—

Figure 1 is a sectional view of a transmission mechanism taken on the line I—I of Fig. 2, Figure 2 is a central sectional view taken on the line II—II of Fig. 1, Figure 3 is a detail sectional view taken through the point of engagement of the teeth approximately on the line III—III of Fig. 2, and Figure 4 is a detail sectional view taken on the line IV—IV of Fig. 3.

In the gearing shown for the purposes of illustrating the principles of the invention the ring gear 5 of a differential mechanism driving the rear shafts 6, 6 of a motor vehicle is driven by a gear or pinion 7 carried by the drive shaft 8. The drive shaft 8 and the driven axles 6 are in different planes parallel to each other and the intermeshing gears 5 and 7 transmitting power from the drive shaft to the ring gear are skew gears in order to obtain certain advantages including quieter operation.

Preferably the teeth are curved longitudinally of the pitch cone and as shown have the form of an Archimedean spiral developed on the pitch cone. The direction of drive and the angle of the teeth are preferably such that during forward driving of the automobile the thrust set up in the drive shaft by the engagement between the spiral teeth of the driving and driven gears is in the direction away from the axles 6. During coasting when the engine is being turned over by power transmitted from the ring gear to the driving gear 7 the engagement causes a thrust on the drive shaft in the opposite direction, that is to say, toward the driven axle and this thrust tends to move the gear 7 inwardly toward the axis of the ring gear and to cause a binding between the gears because of the taper thereof. It will be understood that when the engine is being used as a brake or when the brake is applied to the drive shaft the longitudinal thrust on the drive shaft becomes considerable.

In accordance with the present invention the interengaging gears are formed to resist this thrust. To this end the gears are provided with engaging surfaces which during the driving operation cooperate to resist the thrust resulting from the pressure on the working or driving surfaces. In the gearing shown the thrust resisting surfaces are formed at the tops and bottoms of the teeth as indicated at 10 and 11 in Figs. 3 and 4. That is to say, the tops of the teeth of one or both gears engage against the mating surfaces of the other gears between the teeth. These surfaces at the point of engagement are substantially parallel to the pitch surfaces at the point of engagement of the gears and, therefore, do not function as power transmitting surfaces but function only to resist thrust toward the axial centers of the respective gears, It will be understood that the particular description of the specific embodiment is illustrative merely and is not intended as defining the limits of the invention which may be variously applied.

I claim:

1. The combination with shafts lying at an angle to each other and in different planes of intermeshing spiral bevel gears carried thereby, said gears having teeth of such a length that the tops of the teeth of one gear bear with a sliding and rolling contact against the other gear in the spaces between the teeth thereof to provide thrust resisting engagement, substantially as described.

2. The combination with shafts lying at an angle to each other and in different planes of intermeshing spiral bevel gears carried thereby, the teeth of both gears being of such length that the tops of the teeth of each gear bear against the other gear in the spaces between teeth, substantially as described.

3. The combination with shafts lying at an angle to each other and in different planes of intermeshing spiral bevel gears carried thereby, said gears having surfaces engaging each other in a plane substantially parallel to the pitch surfaces at the point of driving engagement and other surfaces engaging each other with driving contact in planes at an angle thereto, substantially as described.

In testimony whereof, I have signed my name to this specification.

ERNEST L. FICKETT.